(12) United States Patent
Wilkinson, Jr. et al.

(10) Patent No.: US 8,931,231 B2
(45) Date of Patent: Jan. 13, 2015

(54) PANEL MOUNTING SYSTEM WITH REMOVABLE SECURITY CLEAT

(75) Inventors: Edgar Lee Wilkinson, Jr., Cincinnati, OH (US); Walter Clay Murphy, Villa Rica, GA (US)

(73) Assignee: EPS Specialties Ltd., Inc., Cincinnati, OH (US)

( * ) Notice: Subject to any disclaimer, the term of this patent is extended or adjusted under 35 U.S.C. 154(b) by 269 days.

(21) Appl. No.: 13/348,988

(22) Filed: Jan. 12, 2012

(65) Prior Publication Data

US 2013/0183088 A1  Jul. 18, 2013

(51) Int. Cl.
*F16B 3/00* (2006.01)

(52) U.S. Cl.
USPC ............. 52/489.2; 52/489.1; 52/510; 52/710

(58) Field of Classification Search
CPC . E04F 13/0864; E04F 13/0805; E04F 13/081; E04F 13/0826; E04F 13/0821; E04F 15/02044; E04F 13/0814; E04B 2/00; E04B 2002/7487; E04B 2/7457
USPC ............... 52/475.1, 476, 483.1, 489.1, 489.2, 52/510, 511, 710, 711, 745.09
See application file for complete search history.

(56) References Cited

U.S. PATENT DOCUMENTS

| | | | |
|---|---|---|---|
| 3,620,277 A * | 11/1971 | Tummarello et al. | 411/134 |
| 3,686,805 A | 8/1972 | Pofferi | |
| 3,705,471 A | 12/1972 | Allen | |
| 3,717,258 A | 2/1973 | McKinnon | |
| 3,903,671 A * | 9/1975 | Cuin et al. | 52/480 |
| 4,008,872 A | 2/1977 | Thompson | |
| 4,165,852 A | 8/1979 | Chervenak | |
| 4,271,751 A | 6/1981 | Timmons | |
| 4,516,373 A * | 5/1985 | Osawa | 52/387 |
| 5,016,764 A | 5/1991 | Bauer | |
| 5,050,832 A * | 9/1991 | Lee et al. | 248/225.11 |
| 5,110,080 A | 5/1992 | Rieman | |
| 5,222,611 A | 6/1993 | Wood et al. | |
| 5,375,802 A | 12/1994 | Branham, II | |
| 5,379,561 A * | 1/1995 | Saito | 52/235 |
| 5,555,690 A | 9/1996 | Cosentino | |
| 5,671,575 A * | 9/1997 | Wu | 52/403.1 |
| 6,134,854 A * | 10/2000 | Stanchfield | 52/480 |
| 6,289,646 B1 * | 9/2001 | Watanabe | 52/506.01 |
| 6,453,632 B1 * | 9/2002 | Huang | 52/403.1 |
| 6,792,727 B2 * | 9/2004 | Krieger | 52/245 |
| 7,637,465 B2 | 12/2009 | Huang | |
| 7,661,640 B2 | 2/2010 | Persson | |
| 8,006,458 B1 * | 8/2011 | Olofsson et al. | 52/582.1 |
| 8,336,264 B2 * | 12/2012 | Sato et al. | 52/173.3 |
| 2009/0184221 A1 | 7/2009 | Sculler | |

\* cited by examiner

*Primary Examiner* — Brian Glessner
*Assistant Examiner* — Adam Barlow
(74) *Attorney, Agent, or Firm* — Wood, Herron & Evans, LLP

(57) ABSTRACT

A panel mounting system and method of securing a panel to a vertical surface. The panel mounting system, which may be used in a point of sale (POS) display, includes a panel having a channel open to a rear surface of the panel. The channel has a top surface configured to engage a portion of a horizontal cleat and a bottom surface. A channel access opening allows a security cleat to be inserted into the channel through the rear surface of the panel. The security cleat is then repositioned laterally along the axis of the channel, thereby engaging the top and bottom surfaces of the channel and securing the horizontal cleat to the panel. The panel may be decoupled from the horizontal cleat by simply repositioning the security cleat to the channel access opening and removing the security cleat.

16 Claims, 11 Drawing Sheets

PANEL MOUNTING SYSTEM WITH REMOVABLE SECURITY CLEAT

FIELD OF INVENTION

This invention relates to systems and methods for securing panels used for signs, displays and the like. More specifically, it relates to Point of Purchase (POP) displays used to advertise or identify merchandise in a retail environment, such as a supermarket or big box retailer.

BACKGROUND OF THE INVENTION

Point of Purchase (POP) displays are commonly used in retail environments to identify and promote merchandise. POP displays are an effective way to capture the attention of retail customers and make a particular product stand out, thereby increasing sales of that product. POP displays may be permanent or temporary, depending on the nature of the promotion. A display that will be in place for a significant amount of time is typically considered a permanent display, and may be used to promote or advertise items that are sold on a more or less ongoing basis. Because permanent displays are intended to remain in place for an extended period, permanent displays may be constructed using methods and materials that are relatively labor and cost intensive to produce a durable display.

In contrast, a POP display that is expected to have an in-store life that is more temporary, and is typically considered to be a temporary display that will be changed more frequently. Temporary displays may be used when the volume of expected sales of the merchandise being promoted is uncertain, such as when introducing a new line of products, or for seasonal products and for products associated with current vendor promotions. Because the lifespan of a temporary display is limited, it is preferable to have temporary displays that are relatively inexpensive to set up and tear down and/or change. Moreover, due to the frequency with which temporary displays are changed, temporary displays are preferably configured to be changed quickly during off hours or when the store is closed to minimize the disruption to customers. Common types of temporary displays include freestanding cardboard cutouts (i.e., "standees") and other lightweight free-standing floor and wall displays.

To optimize the effectiveness of limited time promotions, temporary displays are often placed in high traffic areas, such as near the entrance of the store at the checkout aisles and in busy aisles. While these locations maximize exposure of the promotion to customers, they may also be in the locations where POP displays are most subject to bumping or other physical interactions with customers. Because temporary displays are designed to be quickly erected and removed, they also tend to be less robust than more permanent displays. This lack of robustness, coupled with the amount of jostling characteristic of the high traffic areas in which the displays are typically located, often results in temporary displays that have portions that are knocked over or knocked off the display or otherwise disrupted.

Thus, there is a need for systems and methods that provide a robust POP display that can be quickly and easily erected and torn down or changed so that the systems and methods are suitable for use with temporary displays.

SUMMARY OF THE INVENTION

In an embodiment of the invention, a panel mounting system is provided that includes one or more horizontal cleats and a panel with one or more channels. The horizontal cleats and channels are configured to be engaged in such a way that the panel is supported by the horizontal cleats. The panel mounting system further includes at least one security cleat that is configured to further engage one of the one or more channels and thereby prevent the channel from disengaging from the corresponding horizontal cleat.

In another embodiment of the invention, a system for attaching a panel to a vertical surface is provided that includes one or more horizontal cleats coupleable to the vertical surface, with each horizontal cleat including a vertical and an angled portion. The panel has a rear surface including one or more channels, with each channel defining upper, lower, and back surfaces within the panel. The cross-sectional shape of the one or more channels is such that an open side of the channel has a narrower vertical dimension than the back surface of the channel. Further, at least one of the upper or lower surfaces of the channel is configured to engage the angled portion of the one or more horizontal cleats. A security cleat having upper and lower flanges that define a cross-sectional shape that is at least partially complementary to the cross-sectional shape of the one or more channels is configured to be accepted by a channel access opening disposed along the channel. The dimensions of the channel access opening are sufficient to allow the security cleat to be inserted within the channel in a position that allows the security cleat to be moved laterally lengthwise along the channel. The panel is thereby secured to the one or more horizontal cleats by inserting the security cleat in the channel access opening and repositioning the security cleat laterally in the channel.

In yet another embodiment of the invention, a method of mounting the panel to the vertical surface is presented that includes coupling the horizontal cleat to the vertical surface and positioning the panel so that a portion of the horizontal cleat engages a top surface of the channel on the rear side of the panel. The method further includes inserting the security cleat into an opening in the channel so that the horizontal cleat is disposed between the security cleat and the back surface of the channel. The panel is then secured by repositioning the security cleat laterally along the length of the channel.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

A system for mounting panels to a vertical surface, such as a wall, includes a frame comprised of vertical support brackets and horizontal cleats. In an exemplary embodiment of the invention, a panel is secured to the horizontal cleats by security cleats, which are inserted into channels formed in the back of the panel. The vertical support brackets may be attached to the vertical surface using standard fasteners, such as screws, and provide a fixture to which the horizontal cleats are attached. The mounted wall panel has generally dovetail-shaped channels routed in the back surface of the panel that line up with the horizontal cleats. The horizontal cleats are configured so that the panel can be suspended from the horizontal cleats by the channels. The channels are further configured to accommodate a separate dovetail-shaped security cleat, which is inserted into a channel access opening in the back of the panel. The channel access opening is configured to accept the security cleat and allow the security cleat to be aligned with the channel. After the wall panel is hung on the horizontal cleat, the security cleat is positioned in the channel access opening behind the horizontal cleat and inserted into the channel by sliding the security cleat laterally along the length of the channel. The security cleat thereby engages the channel and secures the wall panel to the horizontal cleat. To remove the board, the security cleat is merely repositioned laterally along the length of the channel to the channel access opening and removed. The wall panel may then be removed from the frame and replaced with a new panel.

Figure 1A:
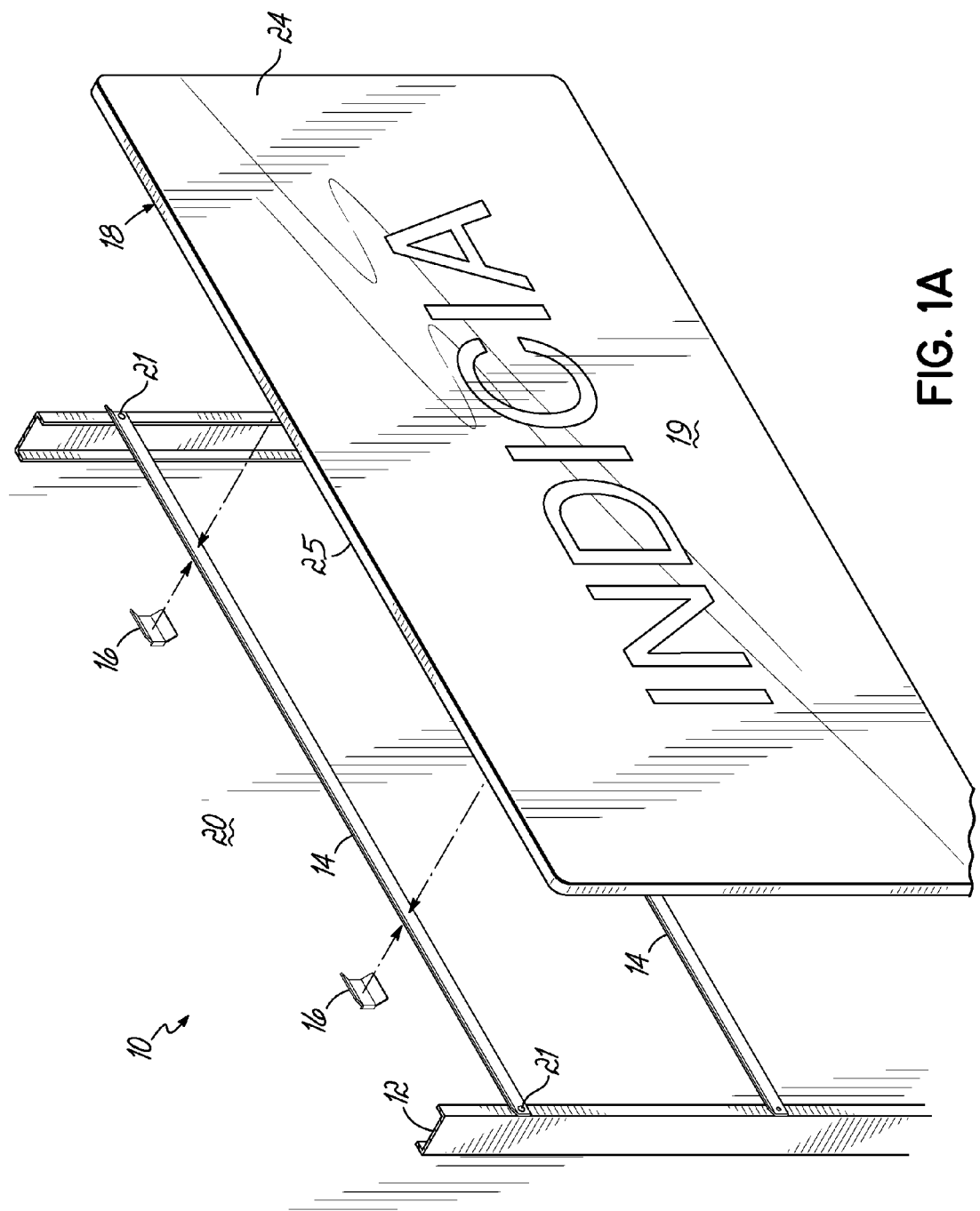
FIG. 1A is an exploded perspective view of the panel mounting system viewed from the front illustrating the relationship between the system components.
Figure 1B:
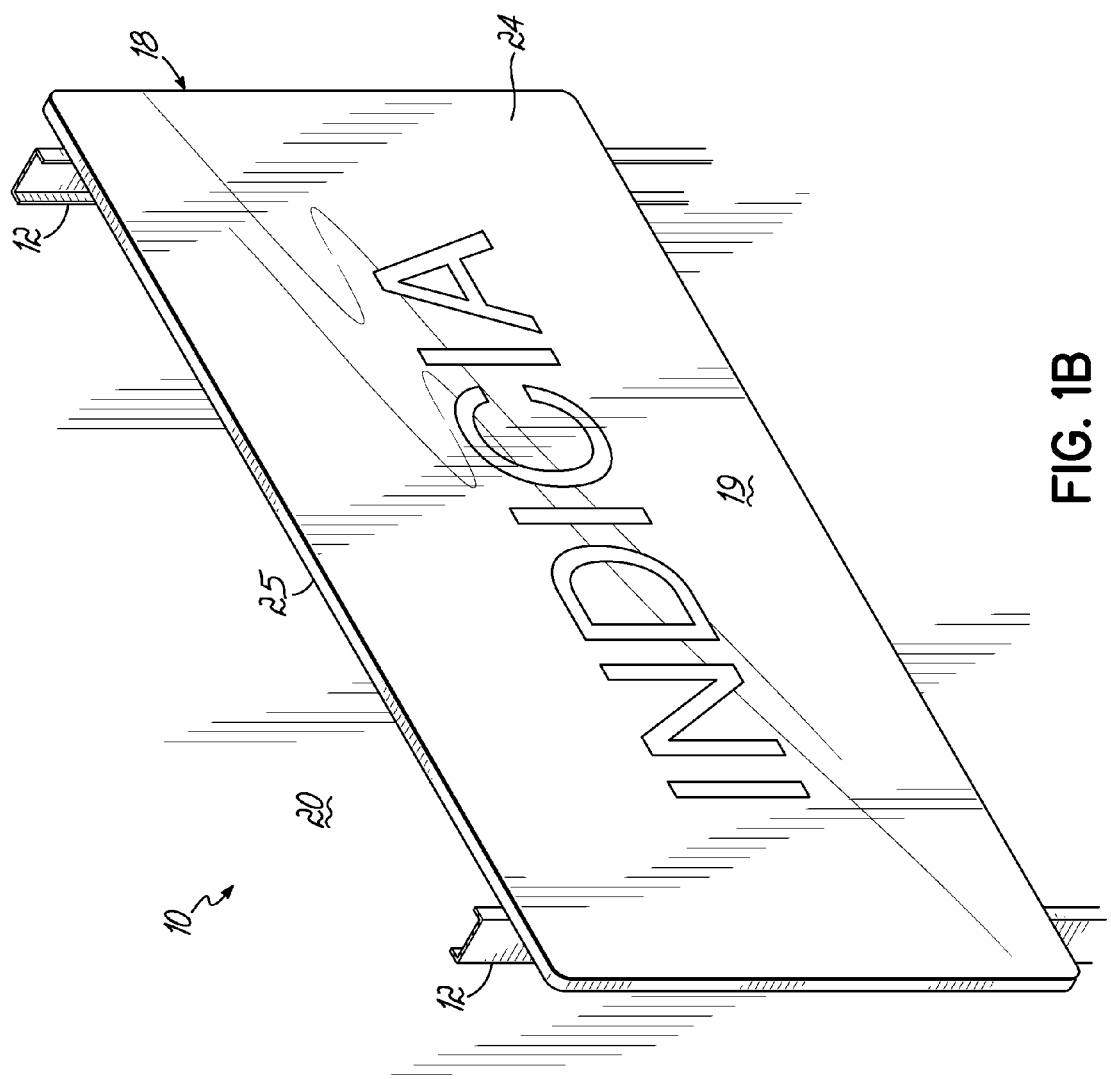
FIG. 1B is a perspective view of the assembled panel mounting system of FIG. 1A.

Turning now to the figures and with reference to FIGS. 1A and 1B, a panel mounting system 10 is illustrated including vertical support brackets 12, horizontal cleats 14, security cleats 16, and a panel 18. The panel 18 may be formed from any material suitable for making displays, such as a laminated foam core board. The front surface 19 of panel 18 includes a color, a decorative design, an advertisement, or some other signage that a user wishes to display. The vertical support brackets 12 may be formed from any suitable material, such as stamped sheet steel, and are shown attached to a vertical surface 20. The vertical support brackets 12 provide stable mounting points for the horizontal cleats 14, and may be attached to the vertical surface 20 using any suitable means, such as drywall screws or other wall fasteners (not shown). The horizontal cleats 14 are likewise made from a suitable material such as stamped sheet steel, and are attached to the vertical support brackets 12 using a suitable fastening means, such as sheet metal or machine screws 21. The vertical support brackets 12 may also include preformed screw holes to facilitate assembly of the panel mounting system 10. In an alternative embodiment, the vertical brackets 12 and horizontal cleats 14 may be supplied as a pre-formed assembly and attached to the vertical surface 20 as a unit. In any case, the vertical support brackets 12 are configured to provide an offset between the horizontal cleats 14 and the vertical surface 20 so that there is a working space behind the horizontal cleats 14. The working space in turn provides room for users to manipulate the security cleats 16 and secure the panel 18 to horizontal cleats 14. Panels may thereby be quickly changed without requiring removal of vertical brackets 12 or horizontal cleats 14.

Figure 2A:
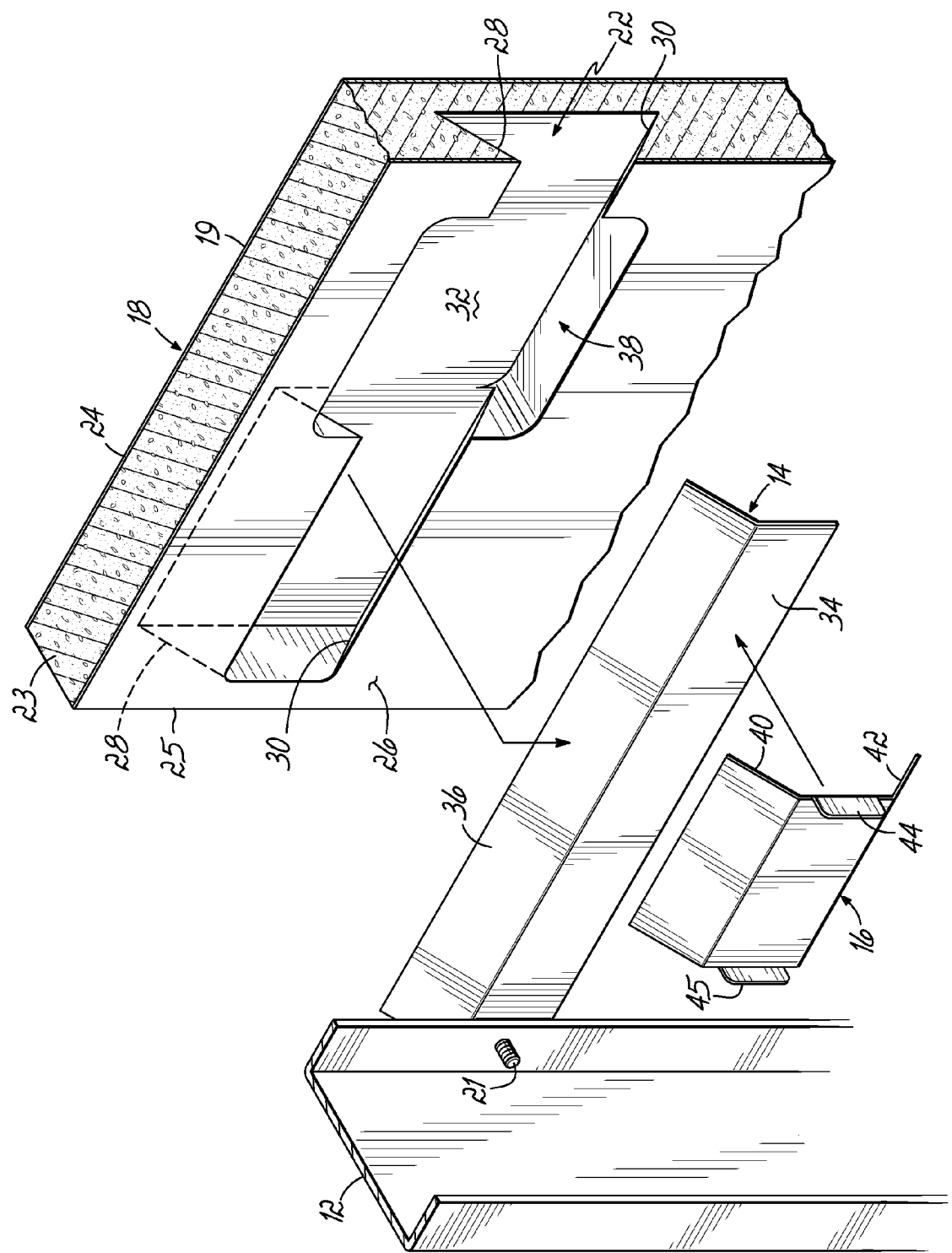
FIG. 2A is an exploded perspective view of a portion of the system in FIGS. 1A and 1B viewed from the back that illustrates additional details of the system components, including a vertical support bracket, a horizontal cleat, a security cleat, and a channel in a rear surface of the panel.
Figure 2B:
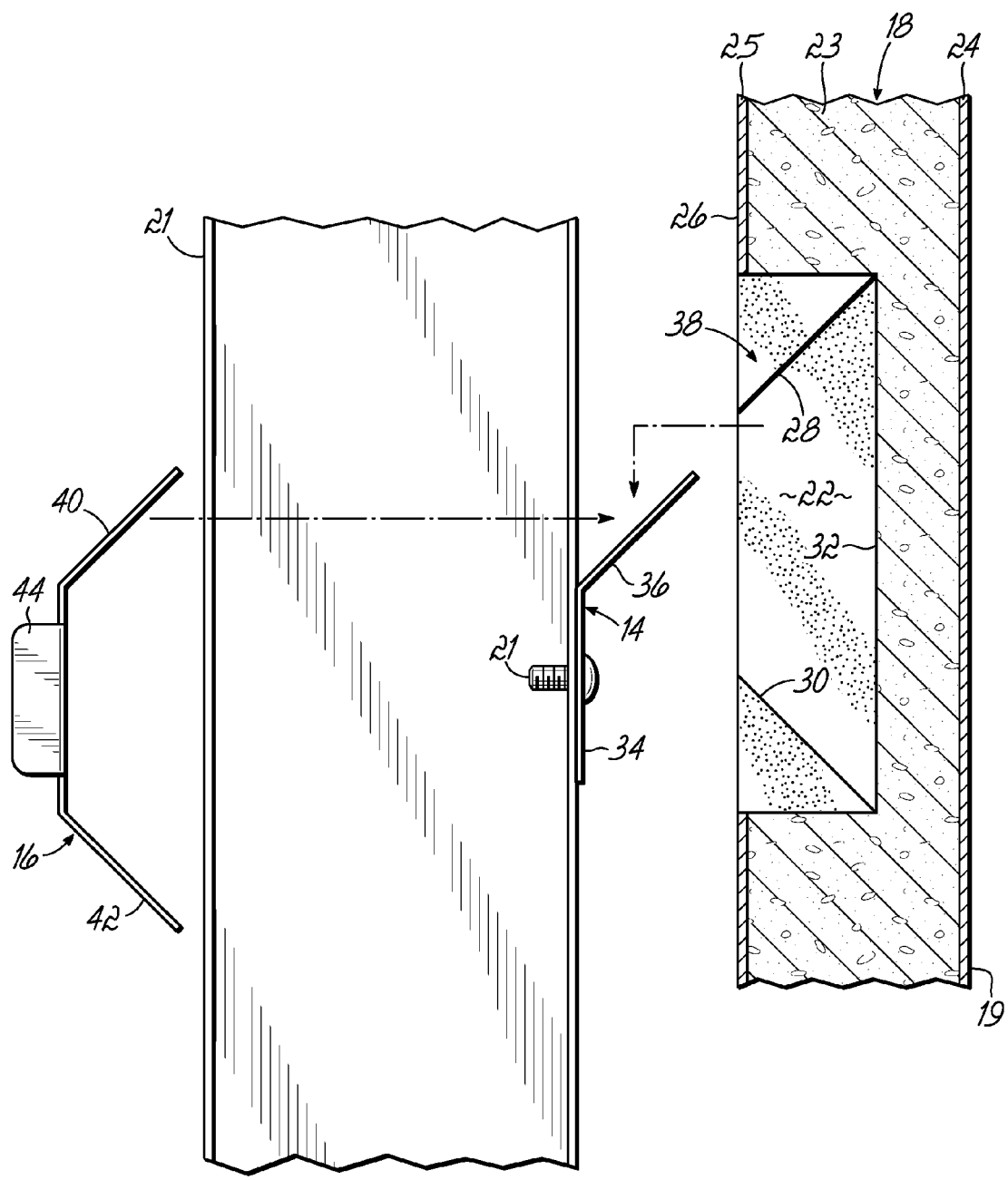
FIG. 2B is a cross-sectional view of the portion of the system of FIG. 2A illustrating details of the panel mounting system prior to engaging the panel with the horizontal cleat.

Referring now to FIGS. 2A and 2B, a portion of the panel mounting system 10 illustrated in FIGS. 1A and 1B is shown viewed from a rear perspective (FIG. 2A) and as a cross-section (FIG. 2B) showing additional details of vertical support bracket 12, horizontal cleat 14, security cleat 16, panel 18, and a channel 22 defined within the panel 18. The panel 18 is shown as a laminated board including a core 23 formed from a suitable material, such as extruded polystyrene foam. The panel 18 also includes first and second laminate layers 24, 25 formed from a suitable material such as a suitable plastic, paper, or cardboard. The channel 22 is open to a rear surface 26 of panel 18, and defines a cavity within the panel 18 having an upper surface 28, a lower surface 30, and a back surface 32. The channel 22 may be hollowed out of panel 18 with a router, such as a Computer Numerical Control (CNC) router having a dovetail shaped cutting tool.

The horizontal cleat 14 includes a vertical portion 34 that is attached to the vertical support bracket 12 by screws 21 or other fastening means, and an angled portion 36 configured to engage the top surface 28 of channel 22. The channel 22 is configured to accept the horizontal cleat 14 so that panel 18 may be hung on the cleat 14. In that way, the panel may be supported and temporarily suspended so that it might be further secured with the horizontal cleats 14. The upper surface 28 of the channel may be configured, in one embodiment of the invention, to be angled at an appropriate angle to the plane of panel 18 so as to match with the angel of the angled portion 36 of cleat 14. The channel 22 includes an access opening 38 configured to accept the security cleat 16 so that the security cleat 16 may be inserted into the channel 22 through the rear surface 26 of panel 18. The security cleat 16 includes an upper flange 40 configured to engage the upper surface 28 of channel 22, and a lower flange 42 configured to engage the lower surface 30 of channel 22. In one embodiment, the upper and lower flanges 40, 42 are angled with respect to cleat 16 to coincide with the angled surface 28, 30 of the dovetailed channel 22. The security cleat 16 may also include two gripping flanges 44, 45 to facilitate manipulation of the security cleat 16 by the user. Although the gripping flanges 44, 45 are illustrated as two vertical flanges, persons having ordinary skill in the art will understand that the security cleat 16 may include gripping mechanisms having various forms or numbers. For example, gripping could be provided by a single flange located near the center of the security cleat 16. Thus, embodiments of the security cleat 16 are not limited to the configuration of the gripping flanges 44, 45 shown.

Figure 3:
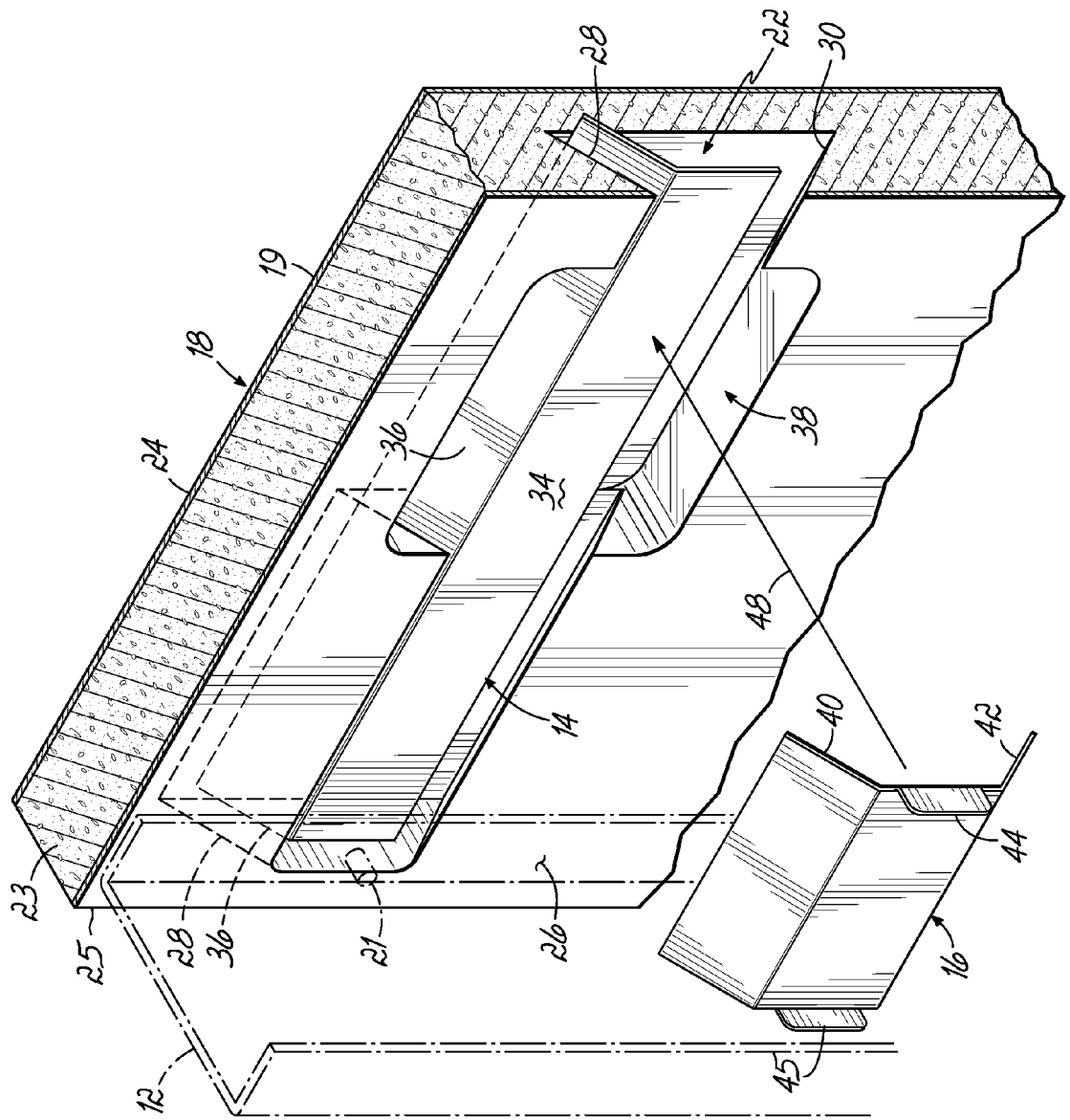
FIG. 3 is a perspective view of the portion of the system in FIG. 2A illustrating the relationship between the horizontal cleat and the channel when the panel is engaged with the horizontal cleat.
Figure 4A:
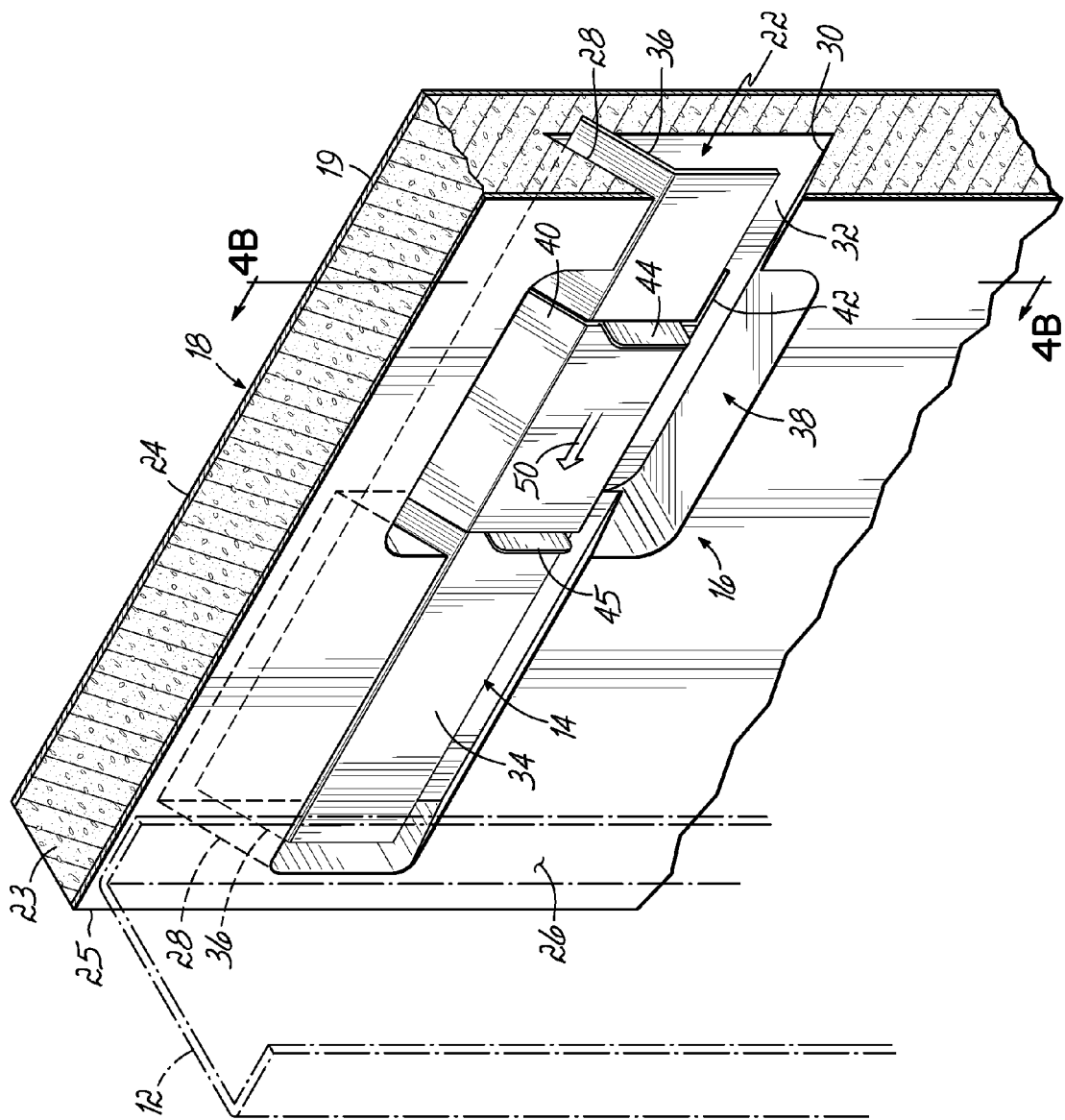
FIG. 4A is a perspective view of the portion of the system in FIG. 3 with the security cleat positioned in a channel access opening.
Figure 4B:
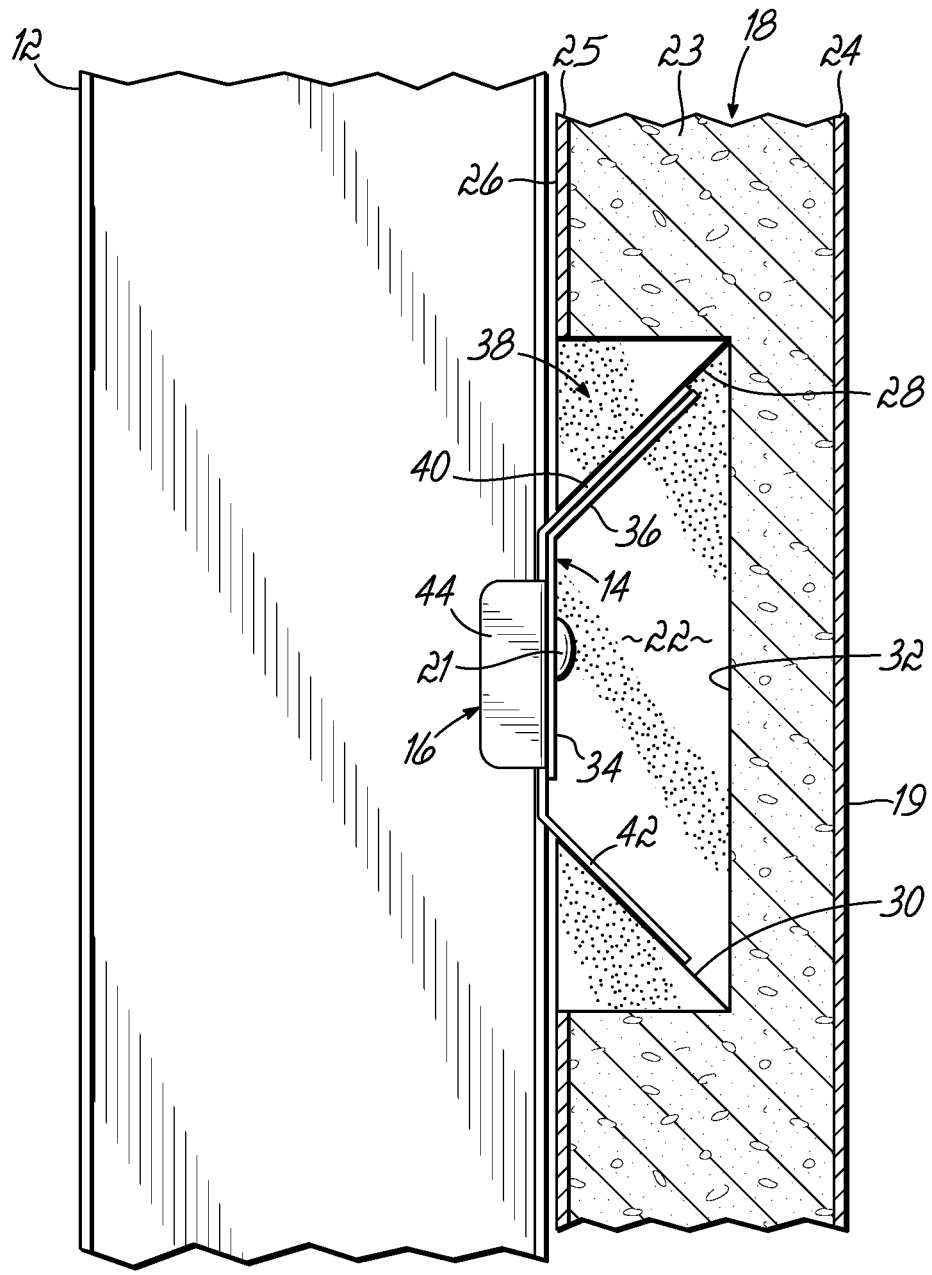
FIG. 4B is a cross-sectional view of FIG. 4A taken along line 4B-4B illustrating the security cleat positioned in the channel access opening.
Figure 5A:
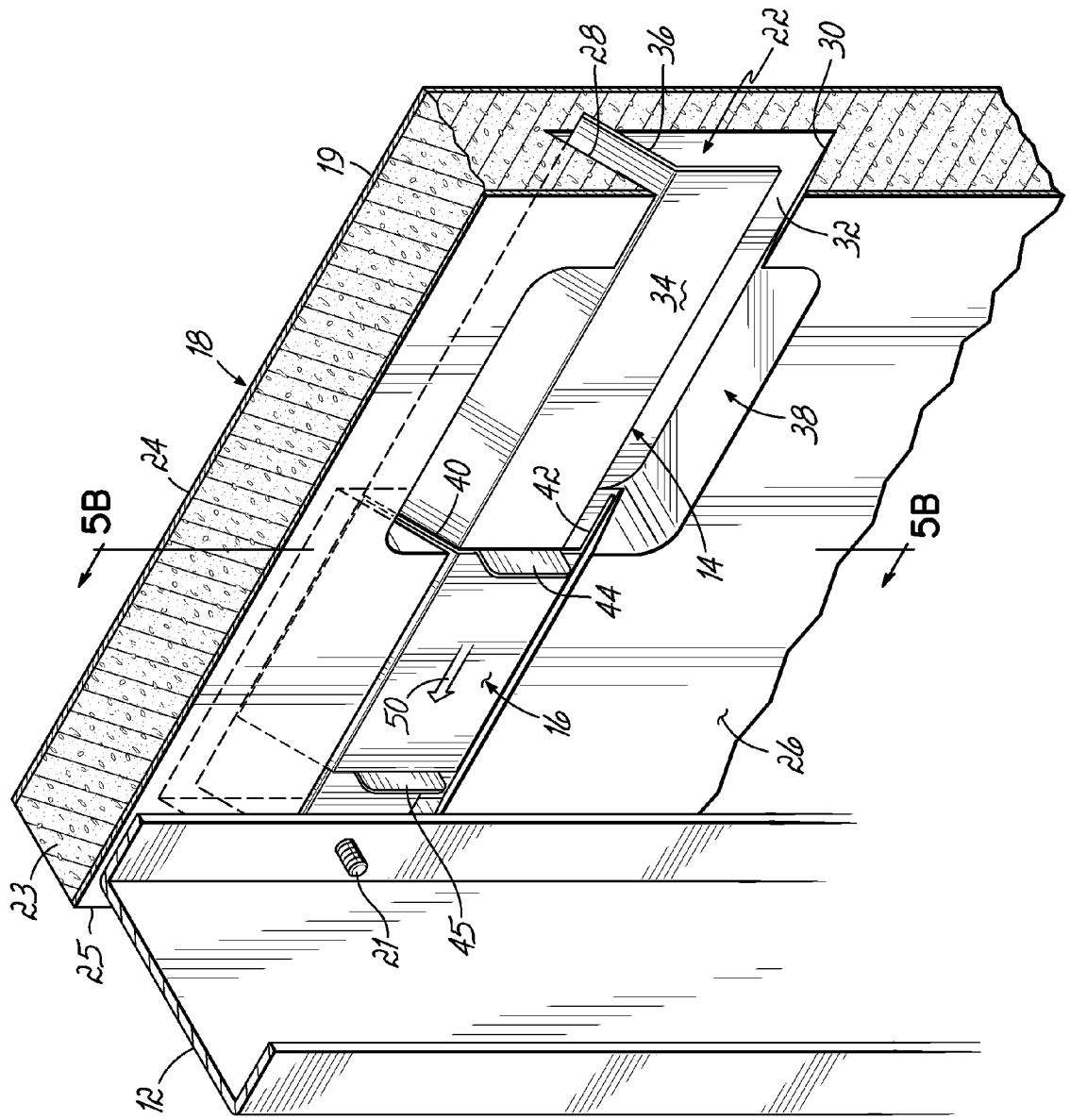
FIG. 5A is a perspective view of the portion of the system in FIG. 4A with the security cleat repositioned in the channel.
Figure 5B:
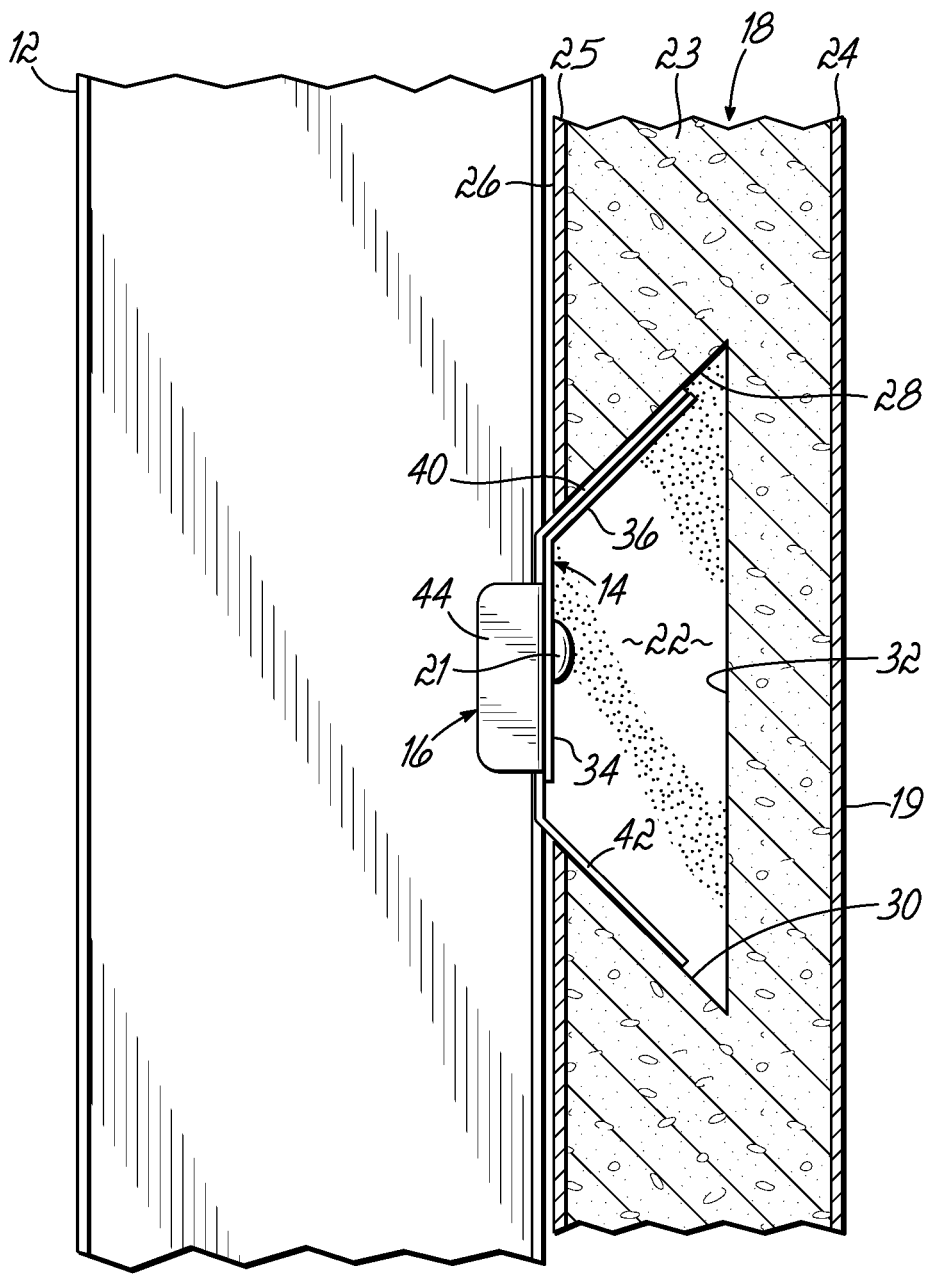
FIG. 5B is a cross-sectional view of FIG. 5A taken along line 5B-5B illustrating the internal arrangement of the panel mounting system with the security cleat repositioned in the channel so that the panel is secured to the horizontal cleat.

Referring now to FIG. 3, the panel 18 is shown engaged with the horizontal cleat 14. The horizontal cleat 14 and the channel 22 are configured so that the upper surface 28 of channel 22 and the angled portion 36 of horizontal cleat 14 have complementary shapes. The panel 18 is thus configured to be engaged with the horizontal cleat 14 by placing the horizontal cleat 14 in the channel 22 so that the upper surface 28 of channel 22 rests on the angled portion 36 of horizontal cleat 14. The one or more horizontal cleats 14 thereby allow a user to hang the panel 18 in front of the vertical surface 20 by orienting the panel 18 so that the one or more channels 22 engage the one or more horizontal cleats 14, as illustrated in exemplary form in FIG. 3. In the embodiment shown in FIG. 3, the channel 22 has a dovetailed shape so that the upper surface 28 of channel 22 provides a flat angled surface. This flat angled surface in turn provides a positive engagement between the angled portion 36 of horizontal cleat 14 and the upper surface 28 of channel 22 so that the panel 18 is held in place by the horizontal cleat 14. Once the horizontal cleat 14 is positioned in channel 22, the security cleat 16 may be inserted into the channel access opening 38 as indicated by arrow 48.

Referring now to FIGS. 4A, 4B, 5A and 5B, the panel 18 is secured to horizontal cleat 14 by the security cleat 16. To this end, the security cleat 16 is inserted into the channel access opening 38 as previously described with regard to FIG. 3. The channel access opening 38 is defined by a cavity that intersects the channel 22 and has a depth sufficient to allow the security cleat 16 to be aligned axially with the channel 22. Typically, the depth of the channel access opening is about equal to the depth of channel 22, although embodiments are not so limited and other depths may be utilized. The channel access opening 38 is further dimensioned so that the vertical (height) and horizontal (width) dimensions are sufficient to allow the security cleat 16 to be inserted into the channel 22 while oriented so that the upper and lower flanges 40, 42 are parallel to respective upper and lower surfaces 28, 30 of channel 22.

Once the security cleat 16 is positioned in the channel access opening 38 and aligned with the channel 22, the security cleat 16 may be repositioned laterally in the channel 22 as indicated by arrow 50. To further facilitate securing the panel 18 to horizontal cleat 14, the height, width, and depth dimensions of channel access opening 38 are preferably selected so that the security cleat 16 is aligned with the channel 22 when the security cleat 16 is fully inserted into the channel access opening 38. For the exemplary dovetail shaped channel 22 illustrated in FIGS. 4A, 4B, 5A, and 5B, the security cleat 16 is aligned with the channel 22 when the upper and lower flanges 40, 42 of security cleat 16 are oriented so that when the security cleat 16 is repositioned laterally, the upper and lower flanges 40, 42 engage the upper and lower surfaces 28, 30 of channel 22, respectively.

As the security cleat 16 is repositioned laterally as indicated by arrow 50, the upper and lower flanges 40, 42 of the security cleat 16 engage the upper and lower surfaces 28, 30 of channel 22, respectively. The security cleat 16 thereby positively locates the panel 18 with respect to horizontal cleat 14, and secures the panel to cleat 14. To this end, the opposing facing contact between the upper flange 40 of security cleat 16 and the upper surface 28 of channel 22 operates cooperatively with the opposing facing contact between the lower flange 42 of security cleat 16 and the lower surface 30 of channel 22 to restrict movement of panel 18 in both the vertical and horizontal planes. Advantageously, the security cleat 16 thereby provides a robust coupling between the panel 18 and the horizontal cleat 14 that prevents the panel 18 from being easily dislodged. More advantageously, the panel 18 may be readily decoupled from the horizontal cleat 14 by simply repositioning the security cleat 16 laterally so that the security cleat 16 is again positioned in the channel access opening 38. The security cleat 16 may then be removed from the channel access opening 38, thereby freeing the panel 18.

The panel mounting system 10 thereby allows users to quickly replace panels 18 by providing a robust and easily reversible mechanism for securing panels 18 to a vertical surface, such as a wall. The speed with which panels 18 can be replaced makes the panel mounting system 10 particularly well suited for displays that must be changed regularly, such as a temporary display in a retail environment. Moreover, because the panel mounting system 10 securely locates the panel with respect to the vertical surface 20, the resulting display may be more resilient to bumping or jostling by customers than traditional temporary displays such as a "standee" or other freestanding temporary display.

Figure 6:
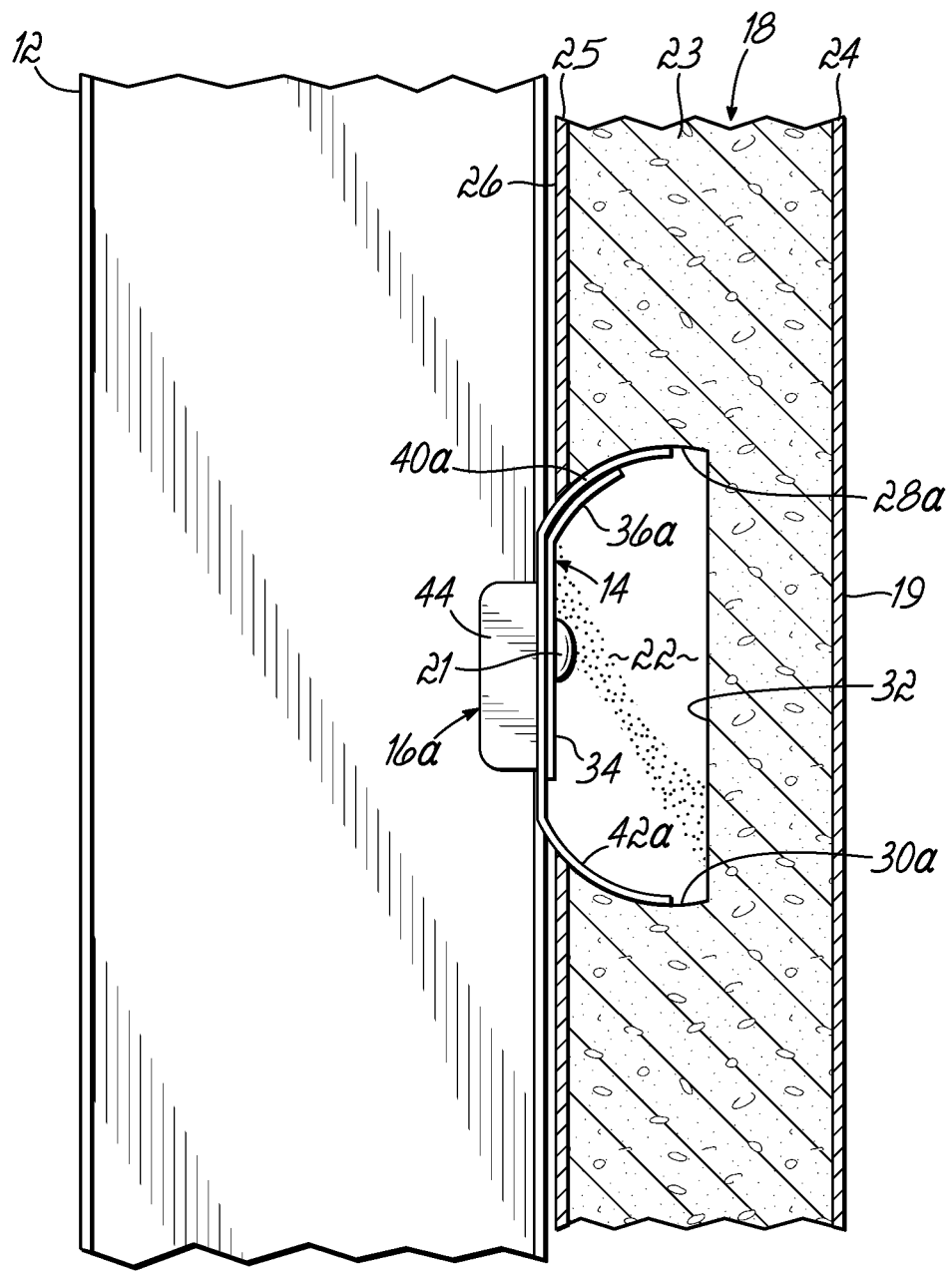
FIG. 6 is a cross-sectional view of an alternative embodiment of the invention having a channel with a curved cross-section.
Figure 7:
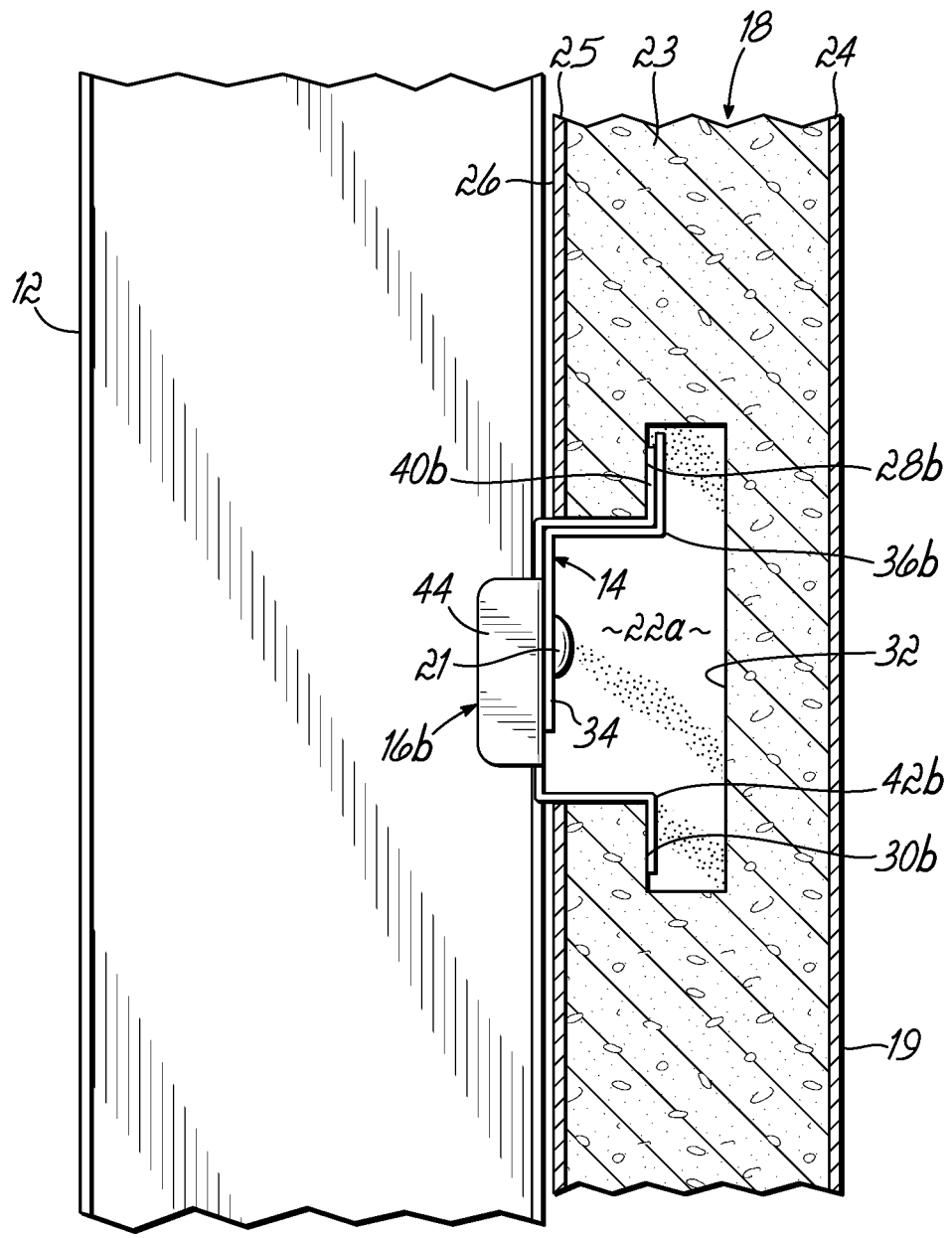
FIG. 7 is a cross-sectional view of another alternative embodiment of the invention having a channel with segmented cross-section.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. For example, although the exemplary embodiments of the invention illustrated in the previous figures are shown with a channel 22 having a dovetail cross-sectional shape, persons with ordinary skill in the art will understand that many cross-sectional shapes may be used. For example, referring now to FIG. 6, the upper and lower surfaces 28*a*, 30*a* of channel 22, and the upper and lower flanges 40*a*, 42*a* of security cleat 16*a* are not required to be flat, and could be curved. Likewise, and referring now to FIG. 7, the upper and lower surfaces 28*b*, 30*b* of channel 22, and the upper and lower flanges 40*b*, 42*b* of security cleat 16*b* may be segmented, so that the security cleat 16*b* engages the channel 22 by interfacing with multiple upper and lower surfaces. Therefore, the invention in its broader aspects is not limited to the specific details of the representative apparatuses and methods, and illustrative examples shown and described. Accordingly, departures may be made from such details without departure from the spirit or scope of applicant's general inventive concept.

What is claimed is:

1. A panel mounting system comprising:
   at least one horizontal cleat, the at least one horizontal cleat including a support portion to be supported and an upper portion extending at an angle to the support portion;
   a panel including at least one channel, the at least one channel having an upper surface and a lower surface opposite the upper surface to define a channel dimension that increases with the depth of the channel, the channel upper surface configured to engage the upper portion of the at least one horizontal cleat so that the panel is supported by the horizontal cleat; and
   at least one security cleat configured to engage the at least one channel, the at least one security cleat including an upper flange extending from the security cleat and a lower flange extending from the security cleat;
   the upper and lower flanges of the at least one security cleat configured to be at least partially complementary to the respective upper and lower surfaces of the at least one channel so the security cleat is laterally slidable in that channel to engage the upper and lower channel surfaces with the horizontal cleat disposed between the security cleat and the channel to secure the panel onto the horizontal cleat and prevent disengagement of the panel from the cleat.

2. The panel mounting system of claim 1, wherein the at least one channel includes at least one access opening formed in the channel and is configured to accept insertion of the security cleat into the channel.

3. The panel mounting system of claim 2, wherein the at least one security cleat is configured to form a joint with the at least one channel when the security cleat is received into the access opening in the channel and slid laterally in the channel.

4. The panel mounting system of claim 3, wherein the joint formed by the security cleat is a dovetail joint.

5. The panel mounting system of claim 1, further comprising: at least one vertical support bracket configured to couple the at least one horizontal cleat to a surface.

6. The panel mounting system of claim 1, wherein the at least one security cleat further comprises:
a gripping portion configured for manipulation by a user for laterally sliding the security cleat.

7. A system for attaching a panel to a vertical surface, the system comprising:
at least one horizontal cleat coupleable to the vertical surface, the at least one horizontal cleat including a support portion to be supported and an upper portion extending at an angle to the support portion;
a panel including a rear surface having at least one channel, the at least one channel defining an upper surface and a lower surface opposite the upper surface and having a cross-sectional shape to define a channel dimension that increases with the depth of the channel, the channel upper surface configured to engage the upper portion of the at least one horizontal cleat;
at least one security cleat including upper and lower flanges defining a cross-sectional shape at least partially complementary to the cross-sectional shape of the at least one channel; and
at least one channel access opening disposed along the at least one channel, the dimensions of the access opening being sufficient to allow insertion of the at least one security cleat into the channel, the security cleat being laterally slidable in the channel so that the security cleat may be moved laterally lengthwise along the channel so the horizontal cleat is disposed between the security cleat and the channel to secure the panel to the at least one horizontal cleat.

8. The system of claim 7, further comprising:
at least one vertical support bracket, wherein the at least one horizontal cleat is coupled to the vertical surface by the at least one vertical support bracket.

9. The system of claim 7, wherein the at least one security cleat further comprises at least one gripping portion configured to facilitate manipulation of the security cleat by a user.

10. A method of mounting a panel to a vertical surface, the method comprising:
coupling a horizontal cleat to the vertical surface;
positioning the panel so that a portion of the horizontal cleat engages a top surface of a channel on a rear side of the panel;
inserting a security cleat into an opening in the channel so that the horizontal cleat is disposed between the security cleat and a back surface of the channel; and
moving the security cleat laterally along the length of the channel so that the panel is secured to the horizontal cleat by the security cleat.

11. The method of claim 10 further comprising:
attaching at least one vertical support bracket to the vertical surface, wherein the horizontal cleat is coupled to the vertical surface by the at least one vertical support bracket.

12. The method of claim 10, wherein the portion of the horizontal cleat that engages the top surface of the channel has a shape that is at least partially complementary to the top surface of the channel.

13. The method of claim 10, wherein the security cleat is configured to have a cross-sectional shape that is at least partially complementary to the cross-sectional shape of the channel.

14. The method of claim 10, wherein the opening in the channel has dimensions sufficient to allow insertion of the security cleat into the channel.

15. The panel mounting system of claim 1, further comprising a plurality of horizontal cleats, the panel including a plurality of channels for engaging respective horizontal cleats.

16. The system of claim 7, further comprising a plurality of horizontal cleats, the panel including a plurality of channels for engaging respective horizontal cleats.

* * * * *